Figures 1, 2:
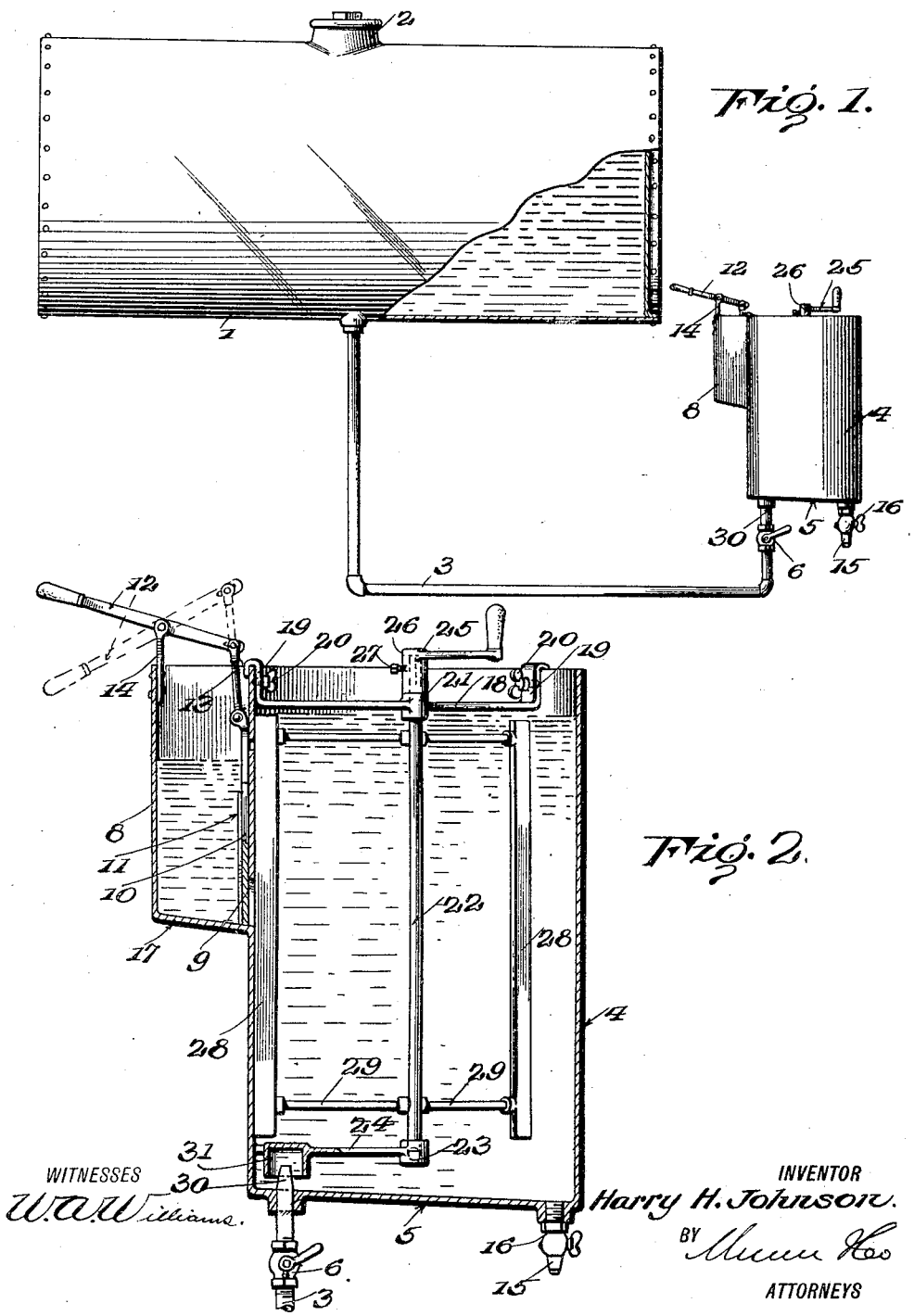

Dec. 30, 1924.

H. H. JOHNSON

LIQUID DISPENSING DEVICE

Filed Aug. 5, 1922

1,521,543

WITNESSES
W. A. Williams.

INVENTOR
Harry H. Johnson.
BY
ATTORNEYS

Patented Dec. 30, 1924.

1,521,543

UNITED STATES PATENT OFFICE.

HARRY HAMLIN JOHNSON, OF WASHINGTON, DISTRICT OF COLUMBIA.

LIQUID-DISPENSING DEVICE.

Application filed August 5, 1922. Serial No. 579,847.

*To all whom it may concern:*

Be it known that I, HARRY H. JOHNSON, a citizen of the United States, and resident of Washington, in the District of Columbia, have invented certain new and useful Improvements in Liquid-Dispensing Devices, of which the following is a specification.

My invention is a liquid dispensing device, and it consists in the combinations, constructions and arrangements herein described and claimed.

An object of my invention is to provide a device of the character described which affords facilities for dispensing predetermined and varying quantities of liquid without permitting the mingling of air with the liquid dispensed.

A further object of my invention is to provide a novel device of the character described which is adapted for use in measuring quantities of liquid commodities and is adapted to permit of the delivery of such measured quantities of liquids without possibility of overflow or spilling.

A further object of my invention is to provide a device of the character described which embodies means for occasioning the egress therefrom of all the liquid commodities supplied thereto.

Other objects and advantages will be apparent from the following description, and the novel features of the invention will be particularly outlined in the appended claims.

My invention is illustrated in the accompanying drawings, forming a part of this application, in which—

Figure 1 is a side elevation, showing a practical embodiment of the invention operatively applied to a container for a liquid, a portion of the walls of the latter being broken away, and Figure 2 is a relatively enlarged vertical section through a fragmentary portion of the embodiment of the invention exhibited in Figure 1.

Referring now to the drawings, the numeral 1 designates a tank or other container which is adapted to receive liquid commodities and which may be supported in a relatively elevated position by any suitable known means, none being shown. The tank or container 1 is illustrated as being provided with a normally closed fill opening or inlet 2 in its upper side and as being in communication at its lower side with a supply conduit 3. The supply conduit 3 depends vertically from the tank or reservoir 1 for the initial part of its length, then extends horizontally for a part of its length and finally vertically into communication at its end remote from the tank 1 with the interior of a measuring container 4 through the bottom 5 of the latter. The vertical portion of the supply conduit 3 that connects with the measuring container 4 is of less length than the vertical portion of the supply conduit that depends from the tank or reservoir 1, whereby the container 4 is positioned below the level of the tank or reservoir 1 and may be supported in such position by any suitable known means, none being shown.

A valve 6 may be interposed in the supply conduit adjacent to the juncture of the latter with the measuring container 4. The bottom 5 of the measuring container 4 slopes from one side edge thereof toward its opposite side edge and the interior of the measuring container 4 is in communication with the supply conduit 3 adjacent to the first named side edge or at the highest point of the bottom 5.

The measuring container 4 may be of any suitable size and shape and for the purpose of the invention is adapted to receive and hold a definite quantity of liquid passing thereinto from the reservoir 1, which quantity may be any desired quantity, as for instance 5 gallons. When the quantity of liquid for which the measuring container 4 is adapted has passed thereinto, any additional liquid introduced into the measuring container 4 will pass through an opening 7 in the side walls of the container 4 into an auxiliary measuring container 8. The auxiliary measuring container 8 is adapted to receive a quantity of liquid less than that for which the measuring container 4 is adapted and preferably the quantity constituting the unit of measurement of the container 4, as for instance one gallon when the container 4 is adapted to receive five gallons before any liquid passing through the container 4 enters the auxiliary container 8 by way of the opening 7.

The measuring container 4 and the auxiliary container 8 are preferably formed with a common side wall in which the opening 7 is provided. It is to be observed at this point that the opening 7 is located adjacent to the upper end of both the measuring container 4 and the auxiliary measuring container 8 and that the latter terminates at its lower end at an appreciable distance above the level of the lower end of the former.

The auxiliary measuring container 8 is also in communication at its lower end with the interior of the measuring container 4 through an opening 9 provided in the common side wall of the two measuring containers. A slide door 10 adapted to move vertically within the measuring container 8 is held in frictional contact with the adjacent side of the common wall of the two containers by vertical guides 11 which are secured to such common wall of the containers, whereby the slide door 10 is in liquid tight contact with the common wall of the containers and communication between the two containers through the opening 9 is thus prevented when the slide door is in position to close the opening 9, as illustrated in Figure 2.

The auxiliary measuring container 8 is shown as being open at its upper end and a slide door operating lever 12 connected by a link 13 with the slide door at the upper end of the latter is shown as being pivoted intermediately upon an upright support 14 which is secured to one side wall of the container 8 adjacent to the upper end of the latter.

The bottom wall 17 of the auxiliary measuring container 8 slopes from its juncture with the vertical walls thereof toward the opening 9 so that all liquid passing into the container 8 will pass by gravity through the opening 9 into the container 4 when the door 10 is open.

The measuring container 4 is open at its upper end and is adapted to have removably disposed therein means operable to stir or agitate the contents of the container 4 and to have a wiping contact with the vertical inner walls of the latter to insure the expeditious and thorough emptying of the container 4 when relatively heavy liquid commodities are placed therein. To this end, a hanger or supporting member 18 adapted to be diametrically disposed within the container 4 is provided and is fashioned adjacent to its ends to provide hook portions 19 having their shanks vertically disposed and being adapted to be hooked over the upper edge of the vertical walls of the container 4. Set screws 20 or the like are threaded through the shanks of the hook portions 19 and are adapted to frictionally engage the vertical walls of the container 4 to releasably hold the supporting member 18 in place. The latter has a hub portion 21 intermediate of its length having a vertical bore therethrough in which is journaled a vertical spindle 22. The latter depends within the container 4 axially of the latter and rests at its lower end in a socket formed in the upper face of a boss or enlargement 23 at the upper end of a radial supporting arm 24 which extends from one inner wall of the container 4 adjacent to the lower end of the latter. A crank 25 has a hub 26 removably held on the spindle 22 at the upper end of the latter by a set screw 27 or the like and is adapted to be grasped and manipulated to rotate the spindle. The latter carries wiper and agitator blades 28 which are supported at the outer ends of radial arms 29 extending from the spindle so that the blades 28 are disposed longitudinally of the container 4 with the outer edges thereof in wiping contact with the inner walls of the container 4 as the spindle is rotated.

The conduit 3 discharges into the container 4 through an end portion 30 thereof which extends slightly above the plane of the bottom as best seen in Figure 2. In order to preclude the possibility that a liquid forced into the container under a relatively great pressure may be projected upwardly in such manner as to cause liquid to overflow from the container 4; an inverted cuplike shield or deflector 31 is arranged in overlying spaced relation to the orifice of the end portion 30 of the supply conduit to deflect inflowing liquids radially and downwardly within the container and to thus prevent undue agitation of the contents of the container 4 when liquid is forced thereinto at relatively high velocity. The inverted cup-like shield or deflector member 31 is preferably an integral part of the arm 24 although it may be supported otherwise within the container in the position in which illustrated.

From the foregoing description of the various parts of the device, the operation thereof may be readily understood. As is well known, when a liquid, particularly a relatively heavy liquid, is poured from a lip or spout or over the side of a measuring container or receptacle, such as are in common use, air mixes with the liquid while it is being poured into the measuring container or receptacle and because of the formation of foam within the measuring container or receptacle frequently precludes the measuring of desired quantities of liquid in a uniform and accurate manner. As a result, quantities less than those ordered are frequently delivered to purchasers of liquid commodities, thus occasioning loss to the purchasers. When my improved dispensing device is used, desired quantities of liquid may be measured out therein and dispensed therefrom without air being permitted to mingle with the liquid dispensed, thereby insuring the delivery of the precise quantity ordered.

Liquid within the tank or reservoir, such as the tank 1, is practically free from air and since the measuring container 4 is in communication at its lower end with the lower part of the tank 1 through the supply conduit 3, liquid entering the measuring container 4 from the tank 1 will likewise be free from air. Any desired quantity of liquid may be measured out through the use of the measuring container 4 and the auxiliary measuring container 8 appendant thereto. It will be assumed for convenience of explanation that the measuring container 4 has a capacity of five gallons before liquid passes therefrom through the opening 7 into the measuring container 8.

Suitable gauges, not shown, may be provided in conjunction with the walls of the measuring containers 4 and 8 so as to indicate the quantities of liquid in such containers at any time. In the event that a quantity of liquid greater than five gallons, the capacity of the container 4, is desired, the valve 6 is opened so that liquid passes by gravity from the tank 1 into the measuring container 4 and after filling the latter to the level of the opening 7 overflows into the auxiliary measuring container 8. When any desired quantity between five gallons as a lower limit and six gallons as the upper limit in the example being described is in the two containers 4 and 8, the valve 6 is closed, thus cutting off the flow of liquid into the container 4. A valve 15 controlling an outlet or discharge conduit 16 which communicates with the measuring container 4 through the bottom of the latter is now opened and the liquid within the measuring container 4 is discharged into any suitable receptacle, not being shown. The slide door 10 controlling the opening 9 is now opened due to operation of the lever 12 and the measured quantity of liquid within the measuring container 8 passes through the opening 9 into the measuring container 4 and thence through the outlet 16 into the receptacle referred to. In the event that a quantity of liquid greater than six gallons is desired, the operation is repeated as required to provide the quantity ordered. In the event that a quantity of liquid less than five gallons is ordered, the auxiliary measuring container 8 is not employed in the dispensing operation as the quantity ordered can be measured in the measuring container 4.

Obviously, the liquid measured in the container 4 or in the container 4 and the auxiliary measuring container 8 will be discharged without there being any possibility of overflow or spilling of the liquid.

The crank 25 may be operated to rotate the spindle 22 and thus stir a relatively heavy liquid disposed within the container 4 to cause egress of all of such liquid through the outlet 15.

Obviously, my invention is susceptible of embodiment in forms other than that illustrated in the accompanying drawings, and I therefore consider as my own all modifications and adaptations of the form of the device herein disclosed which fairly fall within the spirit and scope of the appended claims.

I claim:—

1. In a device of the character described, an upright container having a bottom sloping from one marginal edge thereof to its opposite marginal edge, said container having an inlet extending through the highest part of the bottom and an outlet extending through the lowest part of the bottom, an auxiliary upright container disposed exteriorly of the first container, said containers having one side wall in common and said second container terminating at its lower end above the level of the first container, said common side wall having an opening establishing communication between said containers at a definite height above the level of the bottom of the first container and having a second opening establishing communication between the lower end of the auxiliary container and the first container, the bottom of said auxiliary container sloping toward its juncture with the common side wall and the lower edge of the second named opening in said common side wall lying in the horizontal plane of the lowest part of the bottom of the auxiliary container, and means for controlling the flow of liquid through said second named opening in said common side wall.

2. In a device of the character described, a measuring container having an inlet and an outlet communicating with the lower part thereof, an auxiliary measuring container of less capacity than the first named container carried by the latter, one side wall of the auxiliary container being common to both containers and said auxiliary container terminating at its lower end above the level of both the inlet and the outlet of the first container, said common side wall being provided with an opening therethrough located at a definite height above the level of the bottom of the first container and above the level of the bottom of the second container and with a second opening at a lower level than the first opening and in communication with the lower part of the auxiliary container, and means for controlling communication through said second named opening in the common side wall.

HARRY HAMLIN JOHNSON.